United States Patent [19]
Reichenecker

[11] Patent Number: 6,004,637
[45] Date of Patent: Dec. 21, 1999

[54] LOOSE FILL GRANULES IN THE FORM OF SPHERICAL SEGMENTS, HAVING A SURFACE THAT IS CONVEX ON THE OUTSIDE AND CONCAVE ON THE INSIDE

[75] Inventor: Hans Reichenecker, Metzingen, Germany

[73] Assignee: Storopack Hans Reichenecker GmbH & Co., Metzingen, Germany

[21] Appl. No.: 08/128,279

[22] Filed: Sep. 29, 1993

Related U.S. Application Data

[63] Continuation of application No. 07/615,170, Nov. 19, 1990, abandoned.

[30] Foreign Application Priority Data

May 23, 1990 [DE] Germany .............................. 40 16 597

[51] Int. Cl.⁶ ....................................................... C08J 9/22
[52] U.S. Cl. .............................. 428/35.6; 264/50; 264/53; 264/148; 428/403; 521/56; 521/84.1
[58] Field of Search ................................ 428/314.2, 402, 428/403, 35.6; 264/50, 53, 148; 521/56, 84.1

[56] References Cited

U.S. PATENT DOCUMENTS

| | | | |
|---|---|---|---|
| 2,941,964 | 6/1960 | Houston et al. | 264/51 |
| 2,941,965 | 6/1960 | Ingram | 264/DIG. 13 |
| 3,066,382 | 12/1962 | Zweigle et al. | 264/51 |
| 3,251,728 | 5/1966 | Humbert et al. | 264/51 |
| 3,481,455 | 12/1969 | Graham et al. | |
| 3,961,000 | 6/1976 | Ropiequet | 264/142 |
| 4,328,319 | 5/1982 | Osipow et al. | 264/53 |
| 4,599,269 | 7/1986 | Kohaut et al. | 428/402 |
| 4,627,947 | 12/1986 | Voss. | |
| 4,863,655 | 9/1989 | LaCourse et al. | 264/53 |
| 5,000,891 | 3/1991 | Green | 264/53 |
| 5,035,930 | 7/1991 | LaCourse et al. | 428/35.6 |
| 5,043,196 | 8/1991 | LaCourse et al. | 428/35.6 |

FOREIGN PATENT DOCUMENTS 0087847  7/1983  European Pat. Off. .

*Primary Examiner*—Allan R. Kuhns
*Attorney, Agent, or Firm*—Jones, Tullar & Cooper, P.C.

[57] ABSTRACT

The invention relates to a process for producing loose fill in the form of spherical segments having a convex outer surface and a concave inner surface, and the granules formed. It is provided that starch granules are fed into a drum, and that in the drum, a nucleating agent is drum-coated onto the starch granules, and that the starch granules drum-coated with the nucleating agent are fed to an extruder, in which the starch granules are converted from their solid state into a viscous-liquid state. A starch foam created, by furnishing heat, in the extruder by the decomposition of the nucleating agent emerges from a forming opening of the extruder with a curved surface as a result of the difference in speed prevailing over the cross section of the composition, and that the skein of starch emerging from this forming opening is cut off directly at the forming opening, before any considerable expansion has taken place. The thus-created starch particles are received in a storage container.

4 Claims, 4 Drawing Sheets

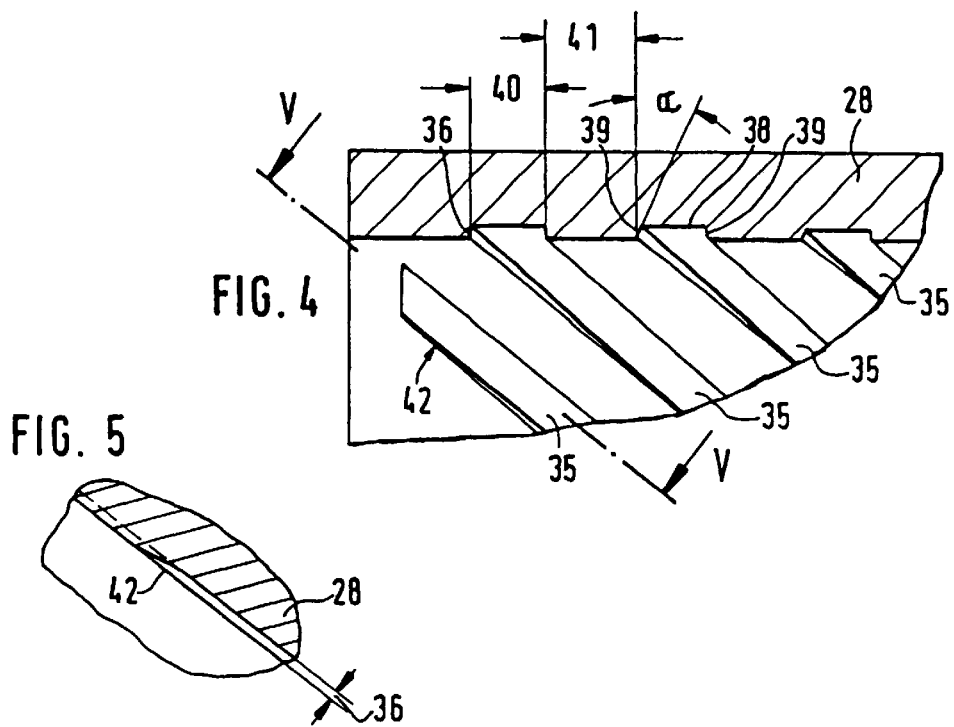
FIG. 4
FIG. 5
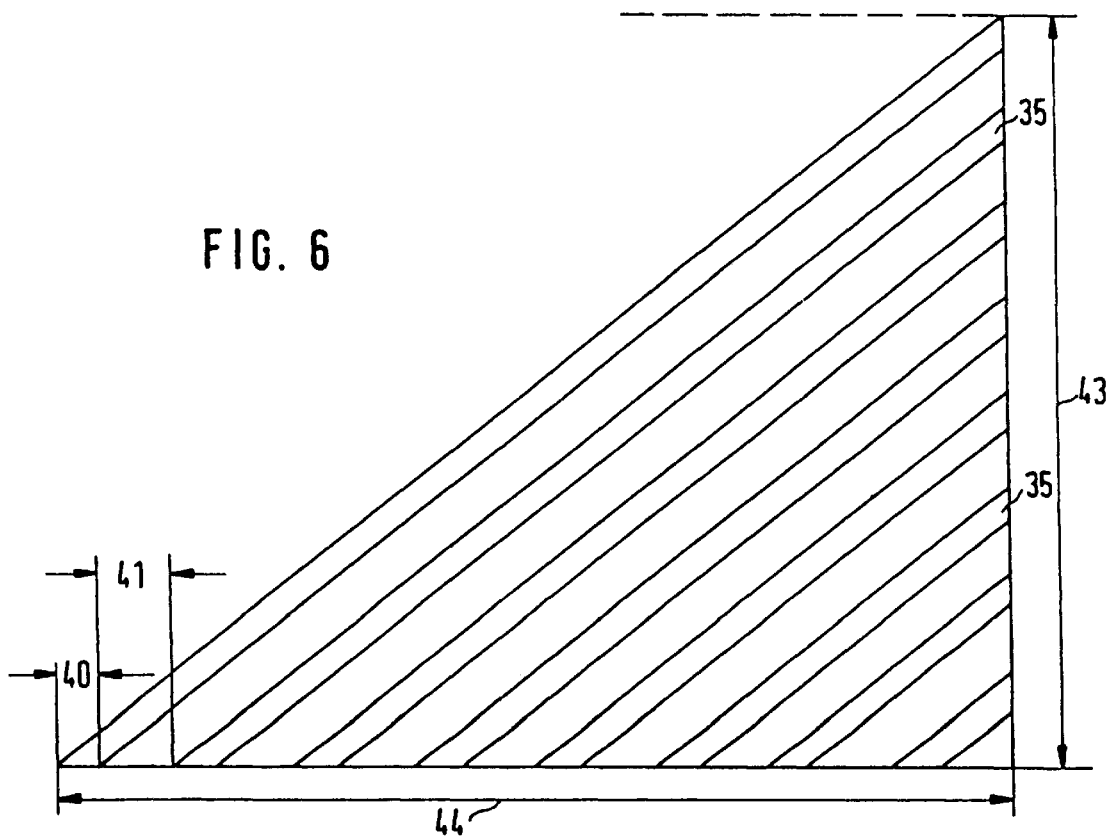
FIG. 6

LOOSE FILL GRANULES IN THE FORM OF SPHERICAL SEGMENTS, HAVING A SURFACE THAT IS CONVEX ON THE OUTSIDE AND CONCAVE ON THE INSIDE

CROSS REFERENCE TO RELATED APPLICATIONS

This application is a continuation of application Ser. No. 07/615,170, filed on Nov. 19, 1990, now abandoned.

BACKGROUND OF THE INVENTION

1. Field of the Invention

The invention relates to a process for producing loose fill packing bodies in the form of spherical segments, having a surface that is convex on the outside and concave on the inside, and to the granules formed thereby.

2. Prior Art

Such packing bodies in the form of spherical segments are known as "loose fill" and are widely used as packing material for items that are to be shipped.

The known packing bodies have the disadvantageous property of being produced from plastic material—such as polystyrene or other polymerization products of styrene, such as a benzene derivative. The packing bodies made of the noted plastic material can be disposed of after use only with difficulty. Especially from the standpoint of ever-increasing awareness of the environment and environmental protection, this is perceived to be a profound disadvantage.

To produce the known loose fill from plastic, a process known from U.S. Pat. No. 3,961,000 is used, in which plastic granules of expandable polystyrene are mixed with additives such as bubble formers, coloring pigments or the like. In a drum, a bubble former is applied to the surface of the plastic granules. Next, these granules are fed into an extruder. The plastic plasticizes as it travels through the extruder, and because of the difference in speed over the cross section of the composition, it emerges from a forming opening in a state in which it has a curved surface. The plastic is cut off directly at the forming opening—even before considerable expansion has occurred. In a first expanding operation, the cut-off plastic particles expand into a specialized three-dimensional shape with a surface that is convex on the outside and concave on the inside. After a certain period in storage, the plastic particles, which are in their first stage of expansion, are subjected to hot steam in a secondary expansion unit and are expanded once more.

U.S. Pat. No. 4,627,947 discloses a process for producing loose fill from plastic having a convex outer surface and a concave inner surface, in which the plastic is fed into an extruder from a fill hopper via an extruder worm. Here the plastic material is drawn into a chamber between the extruder worm and a liner, which in the material intake zone of the extruder is provided with longitudinal grooves. The plastic material, which is plasticized over the course of the extruder, emerges from a forming opening of the extruder with a curved surface, because of the speed difference prevailing across the forming opening. The resultant plastic skein is cut off directly at the forming opening.

U.S. Pat. No. 4,863,655 discloses the use of starch as a basic material for producing a biodegradable packing material. Here, starch having at least 45% by weight of amylose is extruded, and in the extruder, a temperature of approximately 150 to 250° C. prevails. With the process described in this patent, it is possible to make only large-volume "starch blocks", such as insulation plates, in which the size of bubbles in the expanded starch material is relatively large. Moreover, the diameter of these bubbles fluctuates considerably. Accordingly, it is not possible with this process to produce pourable packing bodies in the form of spherical segments; the typical diameter of such "loose fill" packing bodies is approximately up to 3 cm. Given these small dimensions, the bubble size must naturally be substantially less than in the above cases of large-volume starch blocks, to assure solidity of the "loose fill" bodies. Even a few large bubbles in these small packing bodies reduce their stability, and even at an extremely small load causes them to break. It should also be noted that relatively large bubbles especially in the vicinity of the edge of the "loose fill" bodies having a convex outer and concave inner surface—leads to a considerable "danger of crumbling" in this peripheral region, so that the continuous friction during shipping produces a fine "snow" by abrasion, which is deleterious to the packing quality.

SUMMARY OF THE INVENTION

To avoid these disadvantages, the invention has as an object providing a process which enables efficient and economical production of biodegradable "loose fill" packing bodies having a surface that is convex on the outside and concave on the inside.

This object is attained in that starch granules are fed into a drum, and that in the drum, a nucleating agent is drum-coated onto the starch granules, and in that the starch granules drum-coated with the nucleating agent are fed to an extruder, in which the starch granules are converted from their solid state into a viscous-liquid state, and in that a starch foam, created, with heat being furnished, in the extruder by the decomposition of the nucleating agent, emerges from a forming opening of the extruder with a curved surface as a result of the difference in speed prevailing over the cross section of the composition, and in that the skein of starch emerging from this forming opening is cut off directly at the forming opening, before any considerable expansion has taken place, and in that the thus-created starch particles are received in a storage container.

The provisions according to the invention particularly advantageously enable the production of a biodegradable loose fill packing body having a convex outer surface and a concave inner surface that is distinguished by its high environmental acceptability. The starch used as the basic material can be degraded by microorganisms occurring in nature and/or by its natural aging process, without leaving polluting residues.

BRIEF DESCRIPTION OF THE DRAWINGS

Further details of the invention will become apparent from the exemplary embodiments described below in conjunction with the drawings. Shown are:

FIG. 4, which is a fragmentary enlarged detail of an extruder liner with grooves;

FIG. 5, which is a section taken along the line V—V in FIG. 4;

FIG. 6, which is a developed view of the helix of the grooves; and

DETAILED DESCRIPTION OF THE PREFERRED EMBODIMENTS

Figure 1:
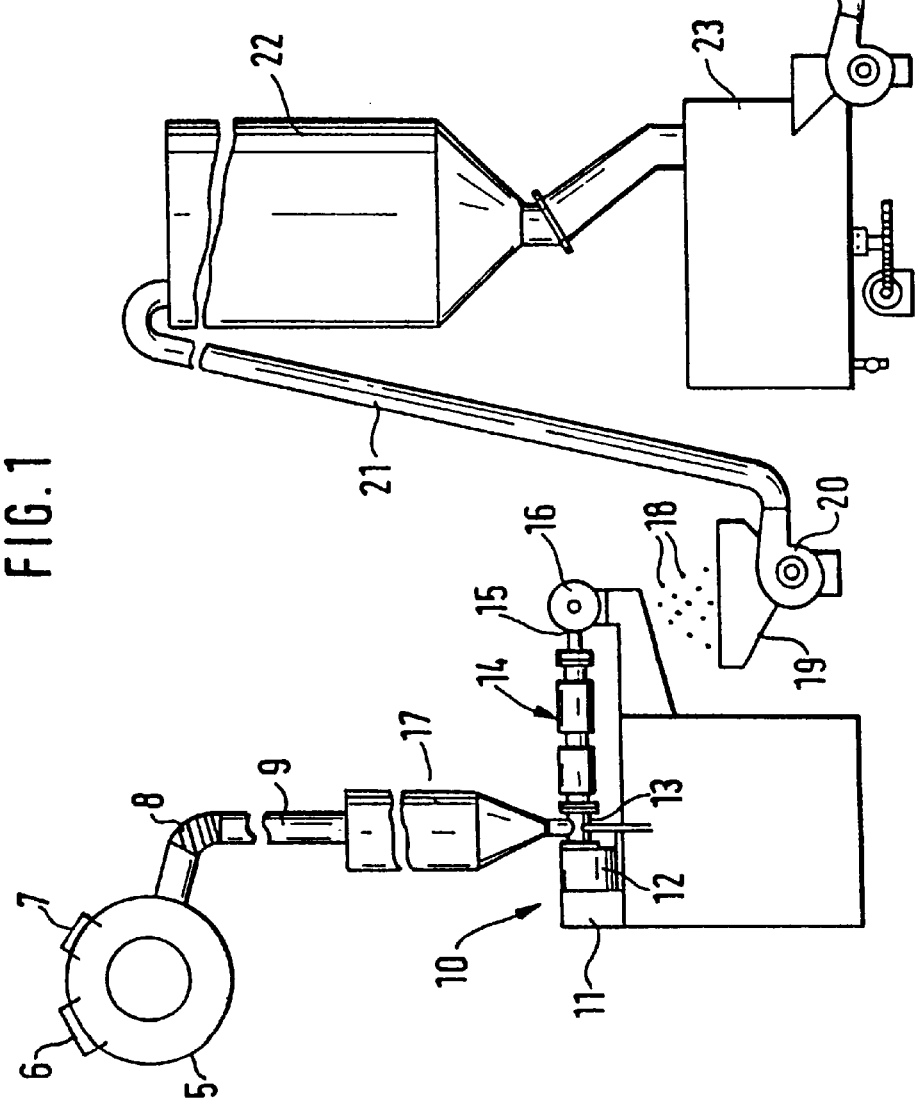
FIG. 1, which is a schematic side view of an apparatus for producing the biodegradable packing bodies, FIG. 2, which is a fragmentary side view of the extruder with the material intake zone.

The apparatus required for performing the process and producing the granules is schematically shown in FIG. 1. Its essential components include a drum 5, an extrusion apparatus 10, a storage container 22, a secondary expansion unit 23, and a further storage container 24.

The drum 5 has openings 6 and 7, through which starch granules and a nucleating agent (bubble former) are added. The starch granules used here comprise pure starch material. However, it is also possible to perform the process described with starch granules that include an admixture of polystyrene. In the ensuing description of the process, no distinction is made between these two types of starting material used to produce loose fill in the form of spherical segments: The term "starch granules" will be used for both types.

Prior to being introduced into the drum 5, the nucleating agent has been ground extremely fine and has a particle size of approximately $40\mu$. The nucleating agent, added in an amount of approximately 0.1 to 0.2% by weight, is drum-coated onto the starch granules in the drum 5. The effect of this drum coating of the nucleating agent onto the starch granules is that the granules are coated with a layer of the aforementioned nucleating agent that adheres firmly by the forces of adhesion and is distributed uniformly over the surface.

The nucleating agent drum-coated onto the starch serves as an initiator of a bubble nucleation in the ensuing extrusion process: This is effected because the solid nucleating agent decomposes in the extruder 14, forming a gas. The liberated gas forms a great number of bubble nuclei in the viscous-liquid starch composition (see below), and these nuclei function as "germ cells" for the cell structure of the expanded starch material and thus affect the fineness of the pores of the resultant starch fill.

The amount of nucleating agent fed into the drum 5 is determined substantially by the decomposition behavior of the nucleating agent, under the influence of heat taking place in the ensuing extruding process. An important characteristic of the nucleating agent, which decisively affects the amount added, is the "theoretical gas yield", that is, the amount of gas (such as carbon dioxide) liberated per unit of weight of the nucleating agent at a predetermined temperature. From these considerations, one skilled in the art will understand clearly how he must dimension the added amount of nucleating agent in order to attain the desired measure of fine porosity of the expanded starch material at a predetermined temperature in the extruder 14.

The nucleating agent can particularly advantageously comprise one carbonate component and one acid component. Then in addition to the decomposition of the carbonate component by the effective heat in the extruding process, the acid component enables a chemical reaction with the carbonate component, which produces an increased development of carbon dioxide. It is also possible to use the multi-component nucleating agent known by the registered trademark "Hydrocerol": its acid component comprises either anhydrocitric acid, rendered hydrophobic, or citric acid monohydrate. This component is treated so that it is water-repellent and thus is miscible with the carbonate component—for instance sodium hydrogen carbonate—and can be stored for long periods, without absorbing moisture from its surroundings.

Another known nucleating agent that is suitable for the process described is known by the designation CF 0556.

The thus-treated starch granules are fed into a fill hopper 17, communicating with the extrusion apparatus 10, by means of a conveyor apparatus 8 and a conveyor line 9. Coloring pigments or other desired additives can optionally also be added in the fill hopper 17.

The extrusion apparatus 10 comprises a drive motor 11, a gear 12, a material intake zone 13 and an extruder 14 and a cutting device 16, which is disposed in front of a forming opening 15 of the extruder 14. The drum-coated starch granules reach the material intake zone 13 via the fill hopper 17 disposed at the end of the conveyor line 9. The mixture comprising the starch granules and the nucleating agent drum-coated onto them and the optionally added additives is drawn into the material intake zone 13 of the extruder 14 by an extruder worm—not shown in FIG. 1. The starch granules, drum-coated with the agent, are carried along by the leading edges of the extruder worm, which rotates at a suitably selected speed, and are thereby conveyed in the axial direction from the material intake zone 13 of the extruder 14 to the forming opening 15 disposed on the other end of the extruder 14. The core diameter of the extruder worm, increasing steadily in the extruder direction, has the effect that the starch granules in their forward motion through the extruder 14, are subjected to a continuously increasing pressure. At the same time, the mixture formed by the compacted starch granules and the nucleating agent drum-coated onto them is heated to a relatively high temperature, until it melts and thus changes into a viscous-liquid state.

An essential factor for the extrusion process is that the nucleating agent is uniformly and finely distributed in the viscous-liquid starch and nucleating agent mixture. This is necessary in order that after extrusion, a regular and fine cell structure of the expanded starch material will be obtained. The drum-coating of the nucleating agent onto the starch granules has the effect that when the individual granules rub against one another, because of the shear motion or rotational motion of the extruder worm, only extremely slight abrasion of the nucleating agent occurs. As a result, the nucleating agent is prevented from accumulating in the interstices among the individual granulate particles during the passage of the starch granules through the material intake zone 13, in which no phase transition as yet occurs. The squeezing and shearing action of the starch granules brought about by the rotational motion of the extruder worm also improves the mixing of starch and nucleating agent, without destroying the "short-order position", effected by the drum-coating with the nucleating agent, in the microscopic range of the starch and nucleating agent mixture. This advantageously means that even after the transition of the starch granules from their solid phase to their viscous-liquid phase, a very fine and very regular three-dimensional distribution of the solid nucleating agent still prevails. However, this means that in an element of relatively large volume, a great many finely distributed nucleating agent particles are present, which act as bubble nucleus formers.

The finely distributed nucleating agent decomposes by the effect of heat, forming gas. The furnishing of heat effected by the temperature of approximately 110° to 130° C. prevailing in the extruder, in combination with the heat of friction produced by the friction of the starch granules, causes a thermal splitting off of the carbonate component of the nucleating agent, as a result of which carbon dioxide gas is set free. This liberation of gas of the nucleating agent leads to the aforementioned formation of bubble nuclei in the viscous-liquid starch material. The fine and approximately homogeneous distribution of the nucleating agent results in a uniform distribution of bubble nuclei through the overall volume. This extensive homogeneity of spatial distribution of the bubble nuclei, brought about by the decomposing nucleating agent, is an essential basis for the fine porosity sought for the loose fill to be produced.

In the extruder 14, during the heating of the starch mixture, a so-called direct gassing with a suitably selected propellant gas is performed. The effect of this is that the propellant enters the viscous-liquid starch composition and is dissolved in it. Because of the pressure and temperature conditions prevailing in the extruder 14, the starch and nucleating agent mixture is supersaturated with propellant gas; that is, more propellant gas dissolves than under normal conditions. Alternatively, it is also possible to use starch granules that already contain the propellant gas from the beginning.

The dissolved propellant gas now diffuses into the bubble nuclei created by the decomposition of the nucleating agent and causes them to expand. The growth of the bubbles is essentially determined by the speed of diffusion and by the supersaturation of the dissolved propellant in the viscous-liquid starch and nucleating agent mixture and by the pressure difference between the pressure prevailing in the extruder and the partial pressure of propellant dissolved in the viscous-liquid starch nucleating agent mixture. The starch and nucleating agent mixture emerges from the forming opening 15 of the extruder 14 in the form of a composition of molten starch foam. Because of the difference in speed prevailing over the composition cross section, the starch foam as it pours from the inner region of the forming opening 15 is given a curved surface.

The skein of starch emerging from the forming opening 15 is cut off immediately after its exit by the cutter device 16.

The difference in pressure between the overpressure prevailing in the interior of the extruder and the—lower pressure of the ambient room atmosphere has the effect that the propellant gas bound in the starch material expands. The cut-off starch particles then expand as they drop by gravity into a first. expanded state, in which they already assume their shape having an inner concave surface and outer convex surface.

This expansion is accompanied by simultaneous cooling, so that the bodies solidify shortly after the forming opening 15 or cutter device 16—and before they have reached the collecting container 19. The cooled, solidified starch particles 18, which are in their first expanded state, are collected in the collecting container 19 and conveyed by a blower 20 through a collecting line 21 to reach the storage container 22.

The starch particles 18 produced in this way can be used for various purposes, such as for packing material.

After a certain period of storage, the starch particles 18 can be conveyed out of the storage container 22 into a secondary expansion unit 23. In this unit, the starch particles can expand again once heat has acted upon them, producing "loose fill" packing bodies of lower density, which advantageously have a substantially lower apparent density. An essential factor in this secondary expansion step is that the heat required for the further expansion is introduced "dry". Accordingly, unlike the known processes, hot steam need not be used to furnish the heat. Such "moist" handling would otherwise lead to immediate destruction of the "loose fill" packing bodies made of starch.

After leaving the secondary expansion unit 23, the re-expanded starch particles 18 are delivered to a further storage container 24. This container preferably comprises screening, or some other open-mesh material, that enables free circulation of air and hence easier drying of the re-expanded starch particles 18.

An alternative means for attaining the object of the invention will now be described in terms of a second exemplary embodiment. This process is performed with an apparatus that is substantially equivalent to the apparatus shown in FIG. 1 and described above.

An essential difference between the two processes compared with the process described above—and thus between the apparatuses used for performing the methods—is that the starch granules here are delivered to a specially embodied material intake zone 13 of the extruder 14. This "groove entry zone" shown in detail in FIGS. 2–6 has the effect that the throughput of material can be approximately doubled, at the same rotational speed of the extruder worm. This increased throughput of starch material particularly advantageously brings about an increased production rate of the process.

Figure 2:
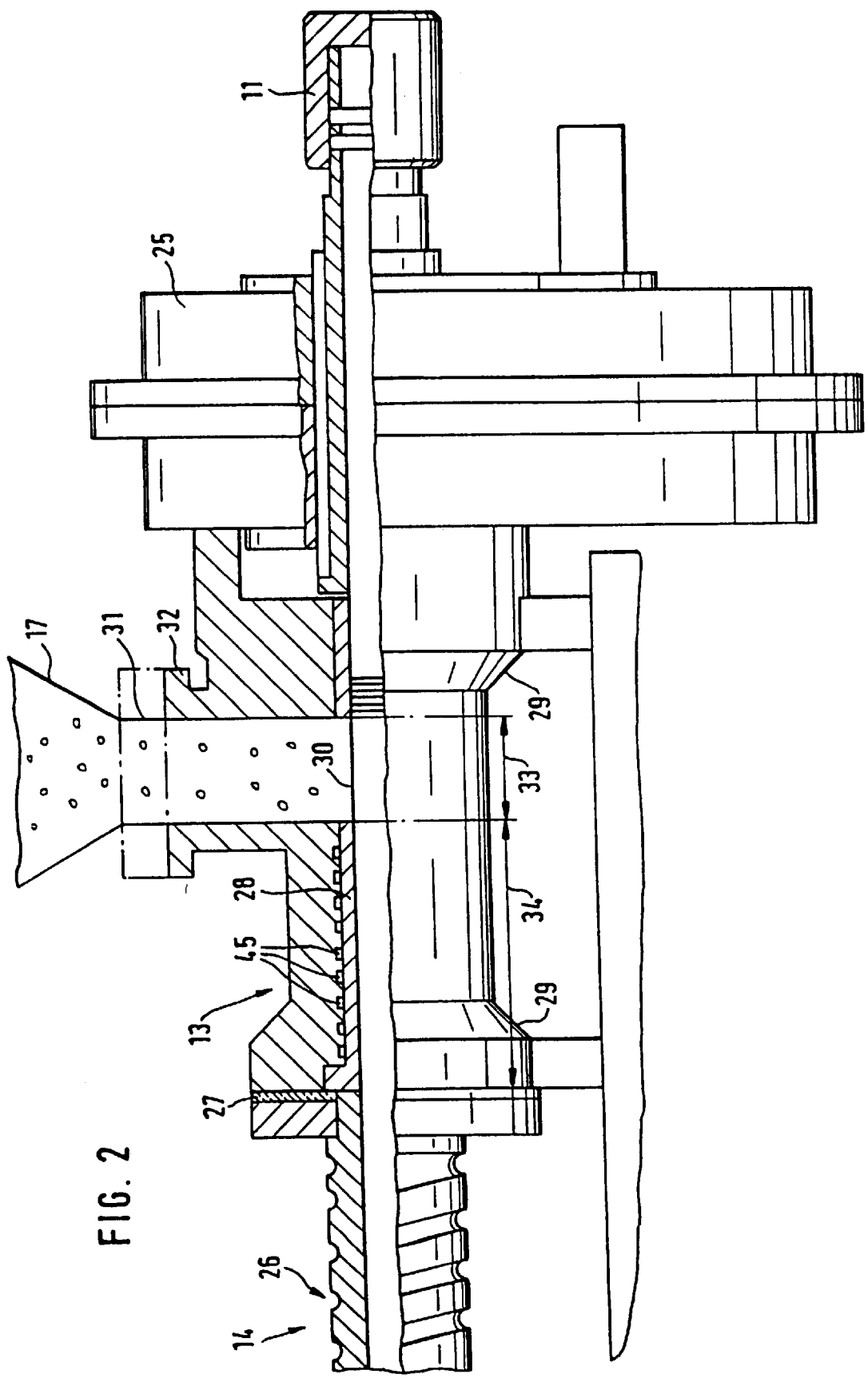

FIG. 2, to on larger scale, shows the material intake zone 13 with the fill hopper 17 mounted on it. The material intake zone 13 is connected on the right-hand side with a reducing gear 25, driven by a motor 11.

Adjoining the material intake zone 13 in the direction of conveyance of the extruder worm is the melting zone 26, in which the starch material changes from its solid to its viscous-liquid state. An essential factor here is that the melting zone 26 and the material intake zone 13 are thermally insulated along their connection 27.

Figure 3:
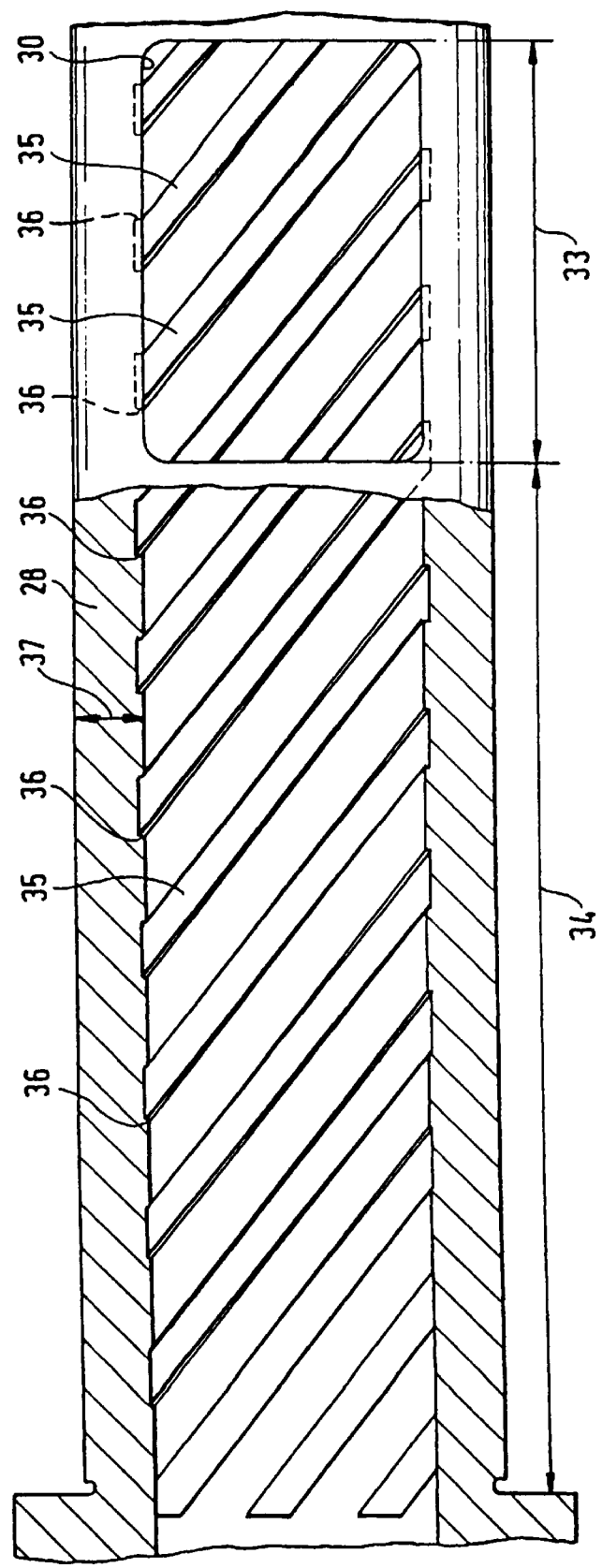
FIG. 3, which is a fragmentary cutaway plan view on the material intake zone.

The extruder worm extends through the material intake zone 13 and melting zone 26 and is driven by the motor 11 via the reducing gear 25. The extruder worm is guided in the material intake zone 13 in a liner 28 that is supported by a carrier 29. The liner 28 is provided with an opening 30, through which the starch material is drawn into the extruder 14 from the fill hopper 17. The fill hopper 17 is connected by its underside 31 to a flange 32 of the carrier 29. The region of the liner outlined by the opening 30 defines the groove entry zone 33. The region of the liner 28 adjoining this groove entry zone 33 in the direction of conveyance of the extruder worm encompasses a transition zone 34. As best seen in FIG. 3, a plurality of longitudinally extending grooves 35 are cut into the liner 28. In the vicinity of the groove entry zone 33, the grooves 35 have a constant incised depth 36. In the transition zone 34 following the groove entry zone 33 in the conveyance direction, the incised depth 36 decreases in the conveyance direction down to zero.

The essential effect of these grooves 35 in the liner 28 is that these grooves form a kind of "escape niche" for a certain number of starch granules, over a certain cross-sectional slice through the extruder in the material intake zone 13. As a result, in a particularly advantageous manner, hindrance to the transport of the starch granule materials in the axial direction by any starch granules adhering to the leading edges of the spiral extruder worm is prevented. Furthermore, this assures constancy of the material pulled along by the extruder worm, assuring a constant quality of the starch foam as it emerges from the forming opening 15 of the extruder 14.

In the embodiment of the above-described components, it is provided that the opening 30 in the liner 28 has a length of approximately 80 mm and a width of 50 mm. The transition zone 34 has a length of approximately 185 mm. The liner 28 has a wall thickness 37 of approximately 13 mm.

FIG. 4 is an enlarged detail of a liner 28 in the vicinity of the groove entry zone 33, with grooves 35 that have a constant incised depth 36.

The grooves 35 have a profile 38 of U-shaped cross section, the two legs 39 of which are inclined outward by an angle α. The angle of inclination α in the present exemplary embodiment is 15°. The incised depth 36 of the grooves 35 is approximately 1.5 mm. The width 40 of the grooves 35 is approximately 10 mm. The grooves in the exemplary embodiment described here have a constant spacing 41 from one another, amounting to approximately 15.5 mm.

The spacing of the grooves is determined by the diameter of the liner 28 and by the number and width of incised grooves 35.

FIG. 5 is a section taken along the line V—V of FIG. 4, which extends through a groove 35. Viewed in the direction of transport of the extruder worm, the grooves 35 have an initial region 42 at the beginning of the liner 28, after which region they attain their maximum incised depth 36, which is subsequently constant in the groove entry zone 33.

FIG. 6 is a developed view of the groove helix in the material intake zone 13. The liner is cut open in the longitudinal direction and has a rectangular contour in the rolled-out state. Eight grooves 35 are incised at regular intervals about a circumference 43 of the liner 28. Following a segment 44 in the transport direction, the helical path has undergone a complete 360° revolution. The segment 44 in the present exemplary embodiment is approximately 203 mm long.

The process for producing "loose fill" packing bodies by means of the apparatus described above is performed as follows: the starch material is drawn into the liner 28 through the opening 30. The extruder worm draws the starch granules into the chamber between the extruder worm and the groove entry zone 33, provided with grooves 35 of constant incised depth 36.

The starch granules, which for instance have a mean core diameter of 0.5 mm, can escape into the grooves 35 in the groove entry zone 33. By this mobility and possibility of escape, fewer starch granules simultaneously rotate in circles with the extruder worm, so that more starch material can be brought in the transport direction into the transition zone 34 through the extruder worm.

By the intrinsic pressure of the starch material and the mobility into the groove entry zone 33, more material can be conveyed in total by the extruder worm in the axial direction of the extruder 14. Because of the more rapid removal and the greater mobility, fewer starch particles "block" the space for the starch granules following them from the fill hopper 17. In the transitions on 34, the incised depth 36 of the grooves decreases to zero in the transport direction. The starch granules are more densely packed and made constant thereby.

The resultant heat of friction must not suffice to convert the starch granules to their viscous-liquid state. Cooling fins 35 (see FIG. 2) are therefore disposed around the liner 28 and the transition zone 34, to enable dissipating the heat.

To assure that the starch granules will not be converted into the viscous-liquid state until the melting zone 26, the transition zone 34 is thermally insulated from the melting zone 26.

The core size of the starch granules to be processed can be varied within a certain range, without substantially restricting the advantageous effect of the process and apparatus described.

Depending on the intake speed, the liner 28 in the groove entry zone 36 can likewise be provided with cooling fins, so that it is always assured that the starch material will not change to the viscous-liquid state over the entire material intake zone 13. Such a phase transition of the solid starch granules would "gum up" the grooves 35, plugging them, and would preclude their advantageous effect.

Figure 7:
FIG. 7 shows a spherical loose fill body as obtained by the method described.

FIG. 7 shows the starch loose fill spherical segment as obtained by said process. As a consequence of the assymmetrical form, cut off at the end of the die after expansion, the typical form as shown in FIG. 7 is produced. It is the essential feature of the present invention that such forms now will be obtained not from polystyrene, but rather from a biodegradeable product such as starch.

What is claimed is:

1. Starch cushioning particles formed by: feeding starch granules into a drum; adding a nucleating agent having a particle size of approximately 40μ in a quantity of from 0.1 to 0.2% of the weight of the starch granules; drum-coating the starch granules with the nucleating agent in the drum such that the nucleating agent is uniformly and finely distributed onto the surfaces of the starch granules; feeding the drum-coated starch granules to an extruder and converting the drum-coated starch granules into a viscous-liquid state; applying heat to the extruder to generate in the viscous-liquid starch bubble nuclei from the decomposition of the nucleating agent; gassing the viscous-liquid starch with a propellant gas such that the starch and nucleating agent mixture is supersaturated with the propellant gas to generate a composition of molten starch foam by expanding the bubble nuclei; cutting the starch foam upon leaving the extruder; and providing for expansion of the starch foam to form the starch particles.

2. The starch cushioning particles as defined in claim 1, wherein the nucleating agent comprises a carbonate component and an acid component.

3. The starch cushioning particles as defined in claim 1, including polystyrene admixed with the starch granules.

4. The starch cushioning particles as defined in claim 1, further formed by
imparting a difference in speed to the starch foam composition over its cross section as it moves through the extruder so that the composition which leaves the extruder has a convex outer surface and a concave inner surface.

* * * * *